US011523401B1

(12) United States Patent
Rashid et al.

(10) Patent No.: US 11,523,401 B1
(45) Date of Patent: Dec. 6, 2022

(54) COORDINATED MAC SCHEDULING OF HALF-DUPLEX CUSTOMER TERMINALS IN SATELLITE INTERNET SYSTEMS

(71) Applicant: Amazon Technologies, Inc., Seattle, WA (US)

(72) Inventors: Mohammad Mamunur Rashid, Redmond, WA (US); Bulin Zhang, Kirkland, WA (US); Deepak, Sammamish, WA (US); Ali Masoomzadeh, Bellevue, WA (US); Baosheng Li, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 16/933,248

(22) Filed: Jul. 20, 2020

(51) Int. Cl.
*H04W 72/08* (2009.01)
*H04W 72/04* (2009.01)
*H04L 5/16* (2006.01)
*H04L 5/14* (2006.01)

(52) U.S. Cl.
CPC ........... *H04W 72/085* (2013.01); *H04L 5/143* (2013.01); *H04L 5/16* (2013.01); *H04W 72/048* (2013.01)

(58) Field of Classification Search
CPC .................................................. H04W 72/085
See application file for complete search history.

(56) References Cited

U.S. PATENT DOCUMENTS

| 6,377,561 | B1 * | 4/2002 | Black ................. H04B 7/18584 370/330 |
| 2010/0323739 | A1 * | 12/2010 | Wan ...................... H04L 1/0026 455/513 |
| 2016/0352415 | A1 * | 12/2016 | Subramaniam .... H04B 7/18517 |
| 2017/0005741 | A1 * | 1/2017 | Wu ........................ H04W 24/08 |
| 2018/0160427 | A1 * | 6/2018 | Ravishankar ..... H04W 72/0453 |

* cited by examiner

*Primary Examiner* — Edan Orgad
*Assistant Examiner* — Won Tae C Kim
(74) *Attorney, Agent, or Firm* — Lowenstein Sandler LLP

(57) ABSTRACT

Technologies directed to scheduling transmissions between a satellite system and customer terminals (CTs) with half-duplex (HD) radios are described. A communication system includes a radio, a modem with a HD controller, a downlink (DL) scheduler, and an uplink (UL) scheduler. The HD controller determines a first set of HD CTs that are eligible DL transmissions for a first radio frame and a second set of HD CTs that are eligible for UL transmissions for a second radio frame. The HD controller determines a throughput value and buffer information about each of the first set and the second set of HD CTs. The HD controller determines a first subset of HD CTs for DL scheduling and a second subset of HD CTs for UL scheduling. The DL scheduler schedules radio resources for a first radio frame and the UL scheduler schedules radio resources for a second radio frame.

20 Claims, 5 Drawing Sheets

COORDINATED MAC SCHEDULING OF HALF-DUPLEX CUSTOMER TERMINALS IN SATELLITE INTERNET SYSTEMS

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
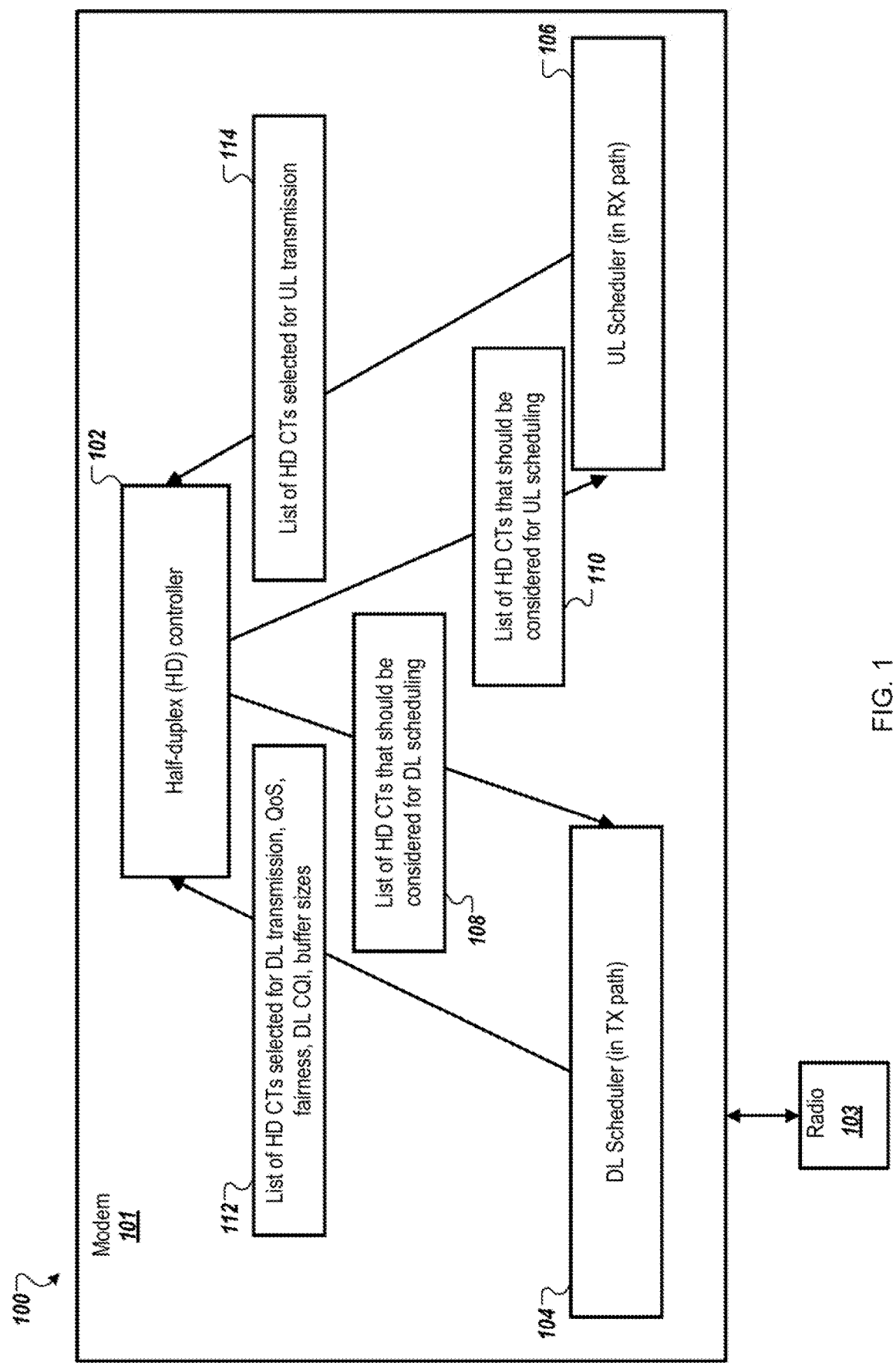
FIG. 1 is a block diagram of a communication system with a radio and a modem with a half-duplex controller according to one embodiment.

Technologies directed to scheduling downlink (DL) and uplink (UL) communications between a satellite communication system and one or more customer terminals (CTs) are described. In some cases, such as for a broadband satellite internet system, a CT can be equipped with a half-duplex (HD) radio. This can provide cost savings when manufacturing a CT, and HD radios consume less power than other radios, such as full-duplex radios. Described herein are solutions for allowing a controller on a satellite device or other communication system to schedule communications with a set of CTs that are equipped with HD radios. Due to low costs of HD radios, CTs that are equipped with HD radios can be offered to customers with certain subscription levels. However, even though uplink (UL) and downlink (DL) bands are separated in frequency for HD radios, CTs with HD radios (also referred to as HD CTs) can suffer from being unable to send and receive information concurrently. Attempting to send and receive information at the same time can lead to collisions of data packets and loss of information, which in turn leads to a degradation in performance of the HD radio in satellite wireless internet systems.

When a satellite communicates with an HD CT, a media access control (MAC) layer at the satellite (SAT) modem is responsible for allocating radio resources in both DL (e.g., from the satellite to the CT) and UL (e.g., from the CT to the satellite) directions. Scheduling of radio resources can be done by a DL scheduler and a UL scheduler in the MAC layer. An optimization decision in the DL scheduler can impact the feasible region of optimization for the UL scheduler. Similarly, an optimization decision in the UL scheduler can impact the feasible region of optimization for the DL scheduler. Further, different orders of executions for the UL scheduler and the UL scheduler can output different scheduling decisions. Some features, such as broadcast, control signaling, random access, and the like can dictate whether DL scheduling or UL scheduling takes precedence and can impose constraints on scheduling decisions.

Satellite-based internet systems or wireless communication systems can experience propagation delays, and switching times between UL and DL communications for HD CTs can affect which CTs are available to send or receive information at any given time. As such, a conventional approach that schedules UL and DL radio resources independently, can introduce an excessive level of collisions between DL and UL communications (e.g., between the satellite and the HD CTs). When collisions between DL and UL communications occur, both the DL and UL communications can fail, which can cause degradation of the performance for HD CTs in satellite wireless internet systems.

Aspects of the present disclosure provide a framework for MAC layer scheduling of HD CTs by a satellite (SAT) modem. Aspects of the present disclosure describe a specialized HD controller module (also referred to as an HD controller herein) located in the MAC layer that can coordinate operation of DL schedulers and UL schedulers for HD CTs that are within a coverage range of a SAT modem. Rather than fully controlling scheduling decisions, the HD controller can provide simple instructions to the DL scheduler and the UL scheduler, while considering simplicity and distributiveness of resources. Instructions from the HD controller can be designed to have flexibility that is gauged by system requirements.

FIG. 1 is a block diagram of a communication system 100 with a radio 103 and a modem 101 with a half-duplex (HD) controller according to one embodiment. The modem 101 includes the HD controller 102, a DL scheduler 104, and a UL scheduler 106. FIG. 1 shows overall interactions of the HD controller 102, the DL scheduler 104, and the UL scheduler 106. The HD controller 102, the DL scheduler 104, and the UL scheduler 106 operate in a MAC layer to provide efficient radio resource allocation. The communication system 100 can communicate with a number of HD CTs, but must do so by scheduling DL and UL transmissions appropriately. The HD controller 102 of the communication system 100 can maintain information about which HD CTs were scheduled for DL communication in a previous radio frame and which HD CTs were scheduled for UL communication in the previous radio frame for a given radio frame. The eligibility of HD CTs for DL transmissions and UL transmissions can depend on factors such as power states of each HD CT, resource allocation among HD CTs, and the like.

In one embodiment, the HD controller 102 can determine that a first HD CT is eligible for being scheduled for DL transmissions and can add the first HD CT to a first list 108 that includes each of the HD CTs that are eligible for being scheduled for DL transmissions. The HD controller 102 can determine that a second HD CT is eligible for being scheduled for UL transmissions and can add the second HD CT to a second list 110 that includes each of the HD CTs that are eligible for being scheduled for UL transmissions. The HD controller 102 can make decisions or determinations about whether an HD CT is eligible for being scheduled for DL or UL transmissions based on factors, such as quality of service (QoS) values, fairness indicators, DL or UL channel quality indicator (CQI) values, DL or UL buffer sizes, or the like. A QoS value is indicative of a QoS for a given DL or UL channel. In other words, the HD controller 102 can obtain information from the DL scheduler or the UL scheduler about which of the HD CTs were or have been scheduled for DL or UL communications in a previous radio frame. In particular, the HD controller 102 can obtain first information from the DL scheduler about which of the HD CTs were scheduled for DL communication in a previous radio frame, a first QoS value, a first fairness indicator, a DL CQI, and a first buffer size. Similarly, the HD controller 102 can obtain second information from the UL scheduler about which of the HD CTs were scheduled for UL communication in a previous radio frame, a second QoS value, a second fairness indicator, a UL CQI, and a second buffer size. A fairness indicator can be a weight or score given to a particular CT that can be compared to other CTs to ensure fairness in DL or UL communications. The CQI values can represent a quality of a particular channel. The buffer sizes can be indicative of how much DL or UL communications are pending for transmission.

For example, the HD controller 102 can determine that the first HD CT has a DL throughput that is greater than a first threshold value and can therefore determine that the first HD CT is eligible for being scheduled for DL transmissions. The first threshold is used to select which of the CTs are eligible for the subset of CTs that are sent to the DL scheduler for scheduling DL transmissions. The first threshold limits how many of the CTs are considered by the DL scheduler for scheduling without the DL scheduler needing to know what the UL scheduler is scheduling. The HD controller 102 can add the first HD CT to the first list 108 that includes HD CTs that are eligible for being scheduled for DL transmissions. Similarly, HD controller 102 can determine that the second HD CT has a UL throughput that is greater than a second threshold value and can therefore determine that the second HD CT is eligible being scheduled for UL transmissions. The second threshold is used to select which of the CTs are eligible for the subset of CTs that are sent to the UL scheduler for scheduling UL transmissions. The second threshold limits how many of the CTs are considered by the UL scheduler for scheduling without the UL scheduler needing to know what the DL scheduler is scheduling. The HD controller 102 can add the second HD CT to the second list 110 that includes HD CTs that are eligible for being scheduled for UL transmissions.

The HD controller 102 can use factors such as a committed information rate (CIR), QoS requirements, DL and UL queue backlog information for each CT to determine whether an HD CT is eligible for being scheduled for DL transmissions, UL transmissions, both, or neither. The HD controller 102 can be coupled to or can include a memory to store information regarding HD CTs and their parameters, such as CIR, QoS, DL/UL queue backlog information, and the like. The information can be stored as a list, table, array, or other suitable format. The CIR, or the CIR value, between the HD controller 102 and an HD CT that is eligible for being scheduled for DL transmissions is a value that is representative of a minimum bandwidth that is allotted by the HD controller 102 for DL transmissions. For example, the HD controller 102 is on a satellite and the HD CT is on a customer terminal or a gateway terminal. The CIR value is the minimum bandwidth that is allowed between the satellite and the customer terminal or the gateway terminal. Similarly, the CIR, or the CIR value, between the HD controller 102 and an HD CT that is eligible for being scheduled for UL transmissions is a value that is representative of a minimum bandwidth that is allotted by the HD controller 102 for UL transmissions.

In one embodiment, the HD controller 102 can create a first list 108 and a second list 110, which are both initialized as empty lists. The HD controller can also have a slot eligibility table stored that indicates whether a slot for transmission is designated for a UL transmission (TX) or a DL receive (RX) communication. The HD controller 102 can first determine if a scheduled slot is designated for a DL or a UL transmission. In a first case, the scheduled slot is not blocked for UL communications. For each HD CT, The HD controller 102 can calculate a difference between a UL throughput and a UL CIR and check if the difference is greater than a DL threshold value. In one embodiment, the difference can be referred to as a difference value, and refers to a difference or discrepancy between the CIR value and the throughput information. If the difference is greater than the DL threshold value, the HD controller can add an identifier (such as a MAC address, device identifiers, or the like) of the HD CT to the UL candidate list (e.g., the second list). In a second case, the scheduled slot is not blocked for DL communications. For each HD CT, The HD controller 102 can calculate a difference between a DL throughput and a DL CIR and check if the difference is greater than a UL threshold value. If the difference is greater than the UL threshold value, the HD controller 102 can add an identifier of the HD CT to the DL candidate list (e.g., the first list).

In some cases, an HD CT can be eligible to be added to both the DL and the UL candidate list. The HD controller 102 can implement a heuristic by which it can determine if the HD CT should be considered for DL transmissions or UL transmissions. For example, the HD controller 102 can consider a DL buffer status of service flows associated with the HD CT, a UL buffer status of service flows associated with the HD CT, corresponding QoS needs, overall system efficiency, optimization policies, or the like. In such cases, the HD controller 102 can add the HD CT to a third list, corresponding to a dual eligibility list. The HD controller 102 can calculate a skew value (e.g., a DL/UL skew) as a ratio of the DL throughput to the UL throughput. For each HD CT in the third list, the HD controller 102 can calculate a skew value, and can order the third list according to the skew value (e.g., in ascending order, in descending order, or in another suitable order). For each HD CT in the third list, the HD controller 102 can check if the skew value is greater than a DL skew threshold value. If the skew value is greater than the DL skew threshold value, the HD controller 102 can check if QoS statistics and DL queue backlogs are within a threshold value and subsequently remove the ID of the HD CD from the DL candidate list. Additionally or alternatively, the HD controller 102 can check if the skew value is greater than a UL skew threshold value. If the skew value is greater than the UL skew threshold value, the HD controller 102 can check if QoS statistics and UL queue backlogs are within a threshold value and subsequently remove the ID of the HD CD from the UL candidate list. The HD controller 102 can then output the first list (e.g., the DL candidate list) and the second list (e.g., the UL candidate list) and send the first list and the second list to the DL scheduler 104 and the UL scheduler 106 respectively. By sending the first list and the second list the HD controller 102 provides the DL scheduler 104 and the UL scheduler 106 with the first list and the second list of HD CTs that should be considered for DL scheduling and UL scheduling respectively.

In one embodiment, the HD controller 102 determines that an HD CT is eligible for being scheduled for both DL transmissions and UL transmissions and adds the HD CT (or an ID of the HD CT) to both the first list and the second list. For example, the HD controller can determine a ratio between a first throughput value corresponding to DL transmissions and a second throughput value corresponding to UL transmissions and store the ratio in a list of HD CTs that are eligible for being scheduled for both DL transmissions and UL transmissions. The HD controller 102 can then add the HD CT to the first set of HD CTs for DL transmissions and to the second set of HD CTs for UL transmissions. The HD controller 102 can determine that a QoS value of the HD CT is within a first QoS range and determine that a DL queue backlog value of the HD CT is within a first threshold value. The HD controller 102 can then remove the HD CT from the first set of HD CTs. Additionally or alternatively, the HD controller 102 can determine that the QoS value of the HD CT is within a second QoS range and determine that a UL que backlog value of the HD CT is within a second threshold value. The HD controller 102 can then remove the HD CT from the second set of HD CTs.

In another embodiment, the HD controller can determine that the HD CT is included in both the first set of HD CTs for DL transmissions and the second set of HD CTs for UL transmissions. The HD controller 102 can determine that a ratio of a DL parameter value, such as a DL skew value, to a UL parameter value, such as a UL skew value, is greater than a first skew value. The HD controller 102 can then remove an identifier of the HD CT from a first set of identifiers of the first set of HD CTs. Additionally or alternatively, the HD controller 102 can determine that a ratio of a DL parameter value, such as a DL skew value, to a UL parameter value, such as a UL skew value, is greater than a second skew value. The HD controller 102 can then remove an identifier of the HD CT from a second set of identifiers of the second set of HD CTs.

In one embodiment, the HD controller can follow the pseudo-algorithm below:

```
Input: List of CTs, Per CT DL and UL committed information rate
(CIR) and QoS requirements, DL/UL queue backlog info per CT
Output: DL candidate (CTs that are proposed for DL scheduling)
list and UL candidate (CTs that are proposed for DL scheduling) list
Initialize the DL candidate list to empty
Initialize UL candidate list to empty
for each CT
    Determine if the scheduled slot is blocked for UL TX and DL
RX by looking up the slot eligibility table
    if the CT is NOT blocked for UL TX in the scheduled slot
        calculate its UL throughput
        if the (UL throughput - UL CIR) > DL threshold
            put the CT ID in the UL candidate list
        endif
    endif
    if the CT is NOT blocked for DL TX in the scheduled slot
        calculate its DL throughput
        if the (DL throughput - DL CIR) > DL threshold
            put the CT ID in the DL candidate list
        endif
    endif
    if the CT is eligible for both DL and UL
        put the CT ID in the dual eligible list
```

```
        calculate DL/UL skew as a ratio between DL and UL throughput
        store the DL/UL skew value in an ordered list according to the
    endif
endfor
for each CT in the dual eligible list
    if DL/UL skew > DL skew threshold
        lookup the latency and other QoS statistics in the DL direction
        lookup the DL queue backlog
        if the QoS statistics are within QoS guarantees and DL queue
backlog is within a threshold
            remove the CT ID from the DL candidate list
        endif
    else if inverse of DL/UL skew > UL skew threshold
        lookup the latency and other QoS statistics in the UL direction
        lookup the UL queue backlog info
        if the QoS statistics are within QoS guarantees and UL queue
backlog is within a threshold
            remove the CT ID from the UL candidate list
        endif
    endif
endfor
Output the DL candidate list
Output the UL candidate list
```

Once the DL scheduler 104 receives the first list 108 of IDs of HD CTs for DL scheduling, it can select a first subset 112 of the first list 108 for DL scheduling in the target radio frame that is being scheduled. The DL scheduler 104 can then send the first subset 112 of the first list 108 to the HD controller 102. Similarly, once the UL scheduler 106 receives the second list 110 of IDs of HD CTs for UL scheduling, it can select a second subset 114 of the second list 110 for UL scheduling in the target radio frame that is being scheduled. The UL scheduler 106 can then send the second subset 114 of the second list 110 to the HD controller 102. The HD controller then uses the first subset 112 and the second subset 114 to schedule DL and UL transmissions in a following scheduling instance before repeating the process for subsequent scheduling instances.

Figure 2:
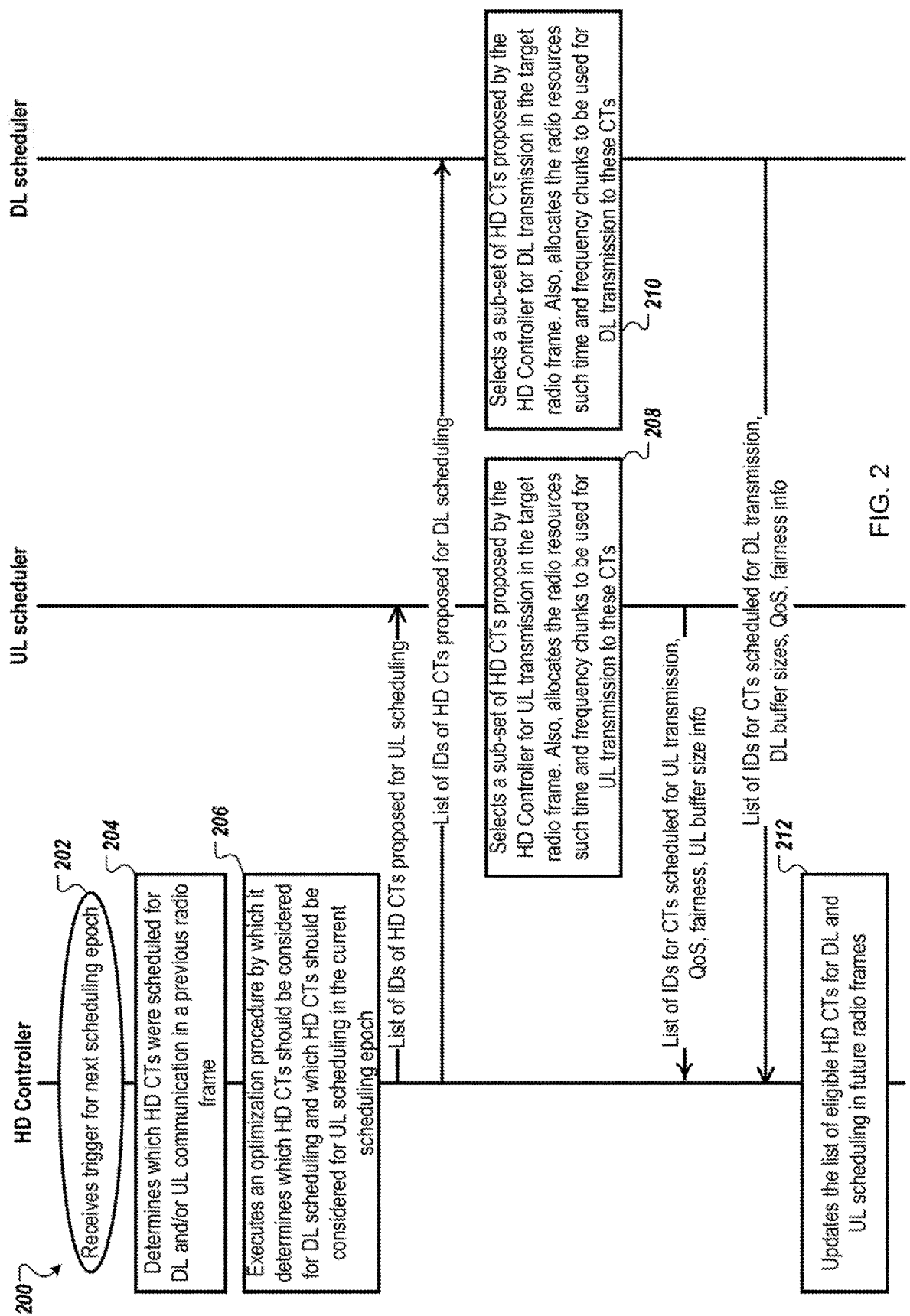
FIG. 2 is a sequence diagram of a method of operations of an HD controller, a DL scheduler, and a UL scheduler of a satellite system that can schedule DL and UL transmissions with HD CTs according to one embodiment.

FIG. 2 is a sequence diagram of a method 200 of operations of an HD controller, a DL scheduler, and a UL scheduler of a satellite system that can schedule DL and UL transmissions with HD CTs according to one embodiment. The method 200 can be performed by processing logic that comprises hardware (e.g., circuitry, dedicated logic, programmable logic, microcode, etc.), software, firmware, or a combination thereof. In one embodiment, the method 200 can be performed by the HD controller, the DL scheduler, and the UL scheduler described herein and illustrated with respect to FIG. 1.

Referring back to FIG. 2, the HD controller, the DL scheduler, and the UL scheduler are in the MAC layer of a satellite communication system. The HD controller receives a trigger for a scheduling epoch (e.g., period or frame) (operation 202). The HD controller can determine which HD CTs are eligible for being scheduled for DL transmissions (e.g., from the satellite communication system to the HD CT) and which HD CTs are eligible for being scheduled for UL transmissions (e.g., from the HD CT to the satellite communication system) for the current radio frame that is being scheduled (operation 204). The HD controller can execute an optimization procedure by which it can determine which HD CTs should be considered for DL scheduling and which HD CT should be considered for UL scheduling in the current epoch (operation 206). In one embodiment, the HD controller can execute the optimization procedure by executing an algorithm similar to the pseudo-algorithm described with respect to FIG. 1. The HD controller can then sent a first list of IDs of HD CTs that are proposed for DL scheduling to the DL scheduler and a second list of IDs of HD CTs that are proposed for UL scheduling to the UL scheduler.

The UL scheduler selects a subset of the HD CTs from the second list of HD CTs that are proposed for UL scheduling for UL transmission in the target radio frame. The UL scheduler can also allocate radio resources such as time and frequency chunks (or blocks) of a radio of the satellite communication system to be used for UL transmissions to the selected subset of HD CTs (operation 208). The radio of the satellite communication system can be an HD radio or a full-duplex radio. The DL scheduler selects a subset of the HD CTs from the first list of HD CTs that are proposed for DL scheduling for DL transmission in the target radio frame. The DL scheduler can also allocate radio resources such as time and frequency chunks (or blocks) to be used for DL transmissions to the selected subset of HD CTs (operation 210).

The UL scheduler sends a list of IDs of HD CTs (e.g., a subset of the second list) that it has selected for UL transmission to the HD controller. The DL scheduler sends a list of IDs of HD CTs (e.g., a subset of the first list) that it has selected for DL transmission to the HD controller. The UL scheduler and the DL scheduler can select subsets of the second list and the first list respectively by considering QoS, fairness, UL/DL buffer size information between the satellite communication system and each HD CT.

Upon receiving the list of IDs of HD CTs selected by the UL scheduler and the list of IDs of HD CTs selected by the DL scheduler, the HD controller can update its list of eligible HD CTs for UL scheduling and its list of eligible HD CTs for DL scheduling to be used in subsequent radio frames (operation 212).

Figure 3:
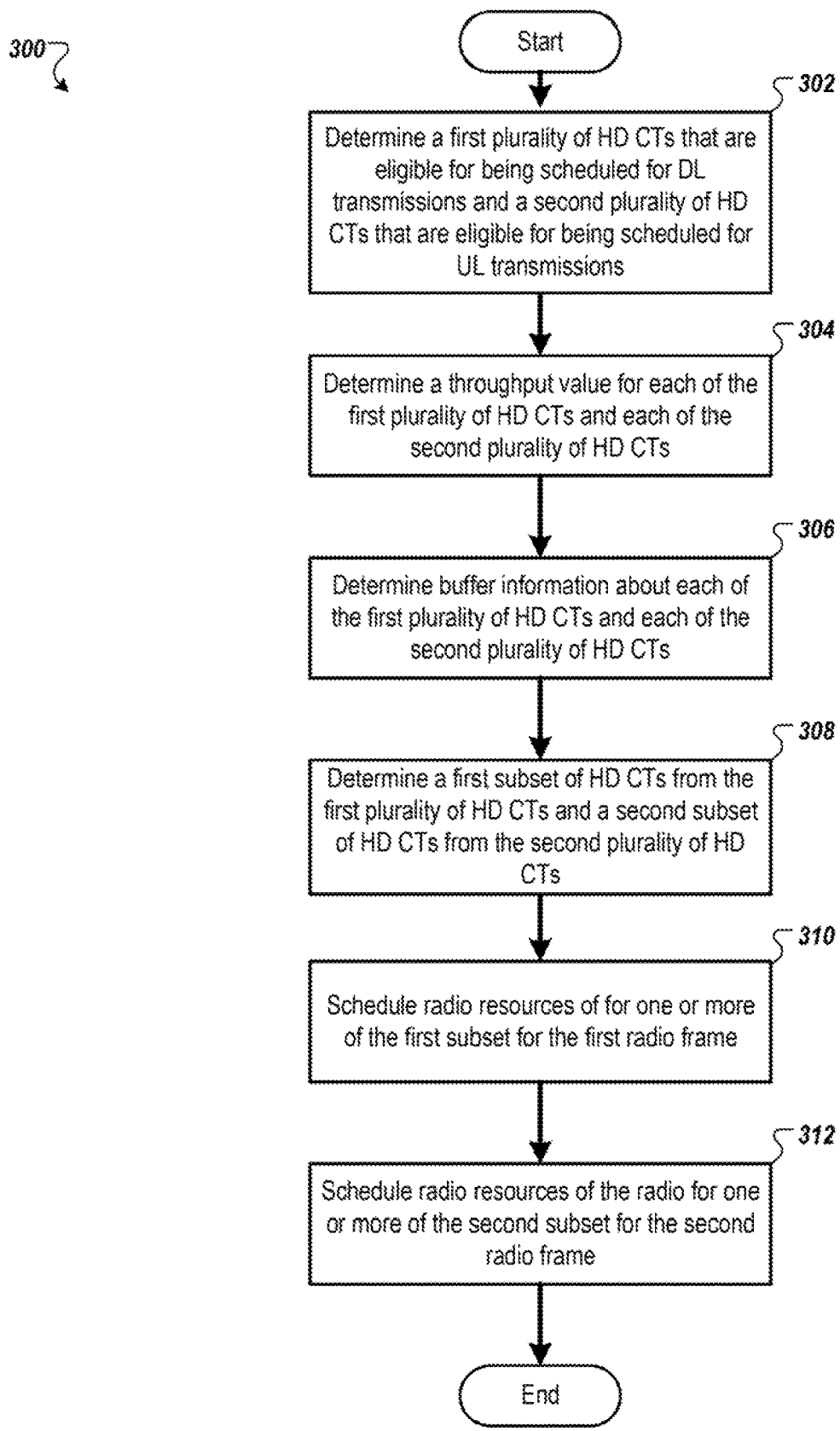
FIG. 3 is a block diagram of a method of operations of an HD controller of a satellite system that can schedule DL and UL transmissions with HD CTs according to one embodiment.

FIG. 3 is a block diagram of a method 300 of operations of an HD controller of a satellite system that can schedule DL and UL transmissions with HD CTs according to one embodiment. The method 300 can be performed by processing logic that comprises hardware (e.g., circuitry, dedicated logic, programmable logic, microcode, etc.), software, firmware, or a combination thereof. In one embodiment, the method 300 can be performed by the HD controller described herein and illustrated with respect to FIGS. 1-2.

Referring back to FIG. 3, the method 300 begins by the processing logic determining a first set of HD CTs that are eligible for being scheduled for DL transmissions for a first radio frame and a second set of HD CTs that are eligible for being scheduled for UL transmissions for a second radio frame (block 302). The processing logic determines a throughput value for each of the first plurality of HD CTs and each of the second plurality of HD CTs (block 304). The processing logic determines buffer information about each of the first plurality of HD CTs and the second plurality of HD CTs (block 306). The processing logic determines, using the throughput values and the buffer information, a first subset of HD CTs from the first plurality of HD CTs and a second subset of HD CTs from the second plurality of HD CTs (block 308). The processing logic, for example, of a DL scheduler, schedules radio resources of a radio for one or more of the first subset for the first radio frame. The processing logic, for example, of a UL scheduler, schedules radio resources of the radio for one or more of the second subset of the radio frame (block 312).

In one embodiment, the processing logic determining a first set of HD CTs for DL transmissions and a second set of HD CTs for UL transmissions. The processing logic can determine the first set of HD CTs by considering a throughput value of the HD CTs and by determining that a throughput value of an HD CT is above a first threshold value. The processing logic can determine the second set of HD CTs by determining that a throughput value of another HD CT is above a second threshold value. In other words, each of the HD CTs in the first set have a throughput that is greater than the first threshold value, and each of the HD CTs in the second set have a throughput that is greater than the second threshold value. The processing logic sends a first list that includes IDs of the first set of HD CTs to a DL scheduler in the MAC layer of the satellite communication system. The processing logic sends a second list that includes IDs of the second set of HD CTs to a UL scheduler in the MAC layer of the satellite communication system. The DL scheduler can determine a subset of the first set that it selects for DL scheduling. The DL scheduler can send a third list that includes the subset of the first list to the processing logic. The processing logic receives the third list which is the subset of the first list. The UL scheduler can determine a subset of the second set that it selects for UL scheduling. The UL scheduler can send a fourth list that includes the subset of the second list to the processing logic. The processing logic receives the fourth list which is the subset of the second list. The processing logic can schedule a radio frame for a DL transmission with an HD CT from the third list or the processing logic can schedule a radio frame for a UL transmission with an HD CT from the fourth list.

In one embodiment, the processing logic transmits a radio frame as a DL transmission in a first frequency band and the processing logic receives a radio frame as a UL transmission in a second frequency band corresponding to DL and UL frequency bands of the HD radios of the HD CTs. The satellite communication system can include either an HD radio or a full-duplex radio.

In another embodiment, the processing logic begins a method by determining a first set of HD CTs that are eligible for being scheduled for DL transmissions for a first radio frame and a second set of HD CTs that are eligible for being scheduled for UL transmissions for a second radio frame. The processing logic determines throughput information about each of the first set of HD CTs and each of the second set of HD CTs. The processing logic determines buffer information about each of the first set of HD CTs and each of the second set of HD CTs. The processing logic determines, using the throughput information and the buffer information, a first set of identifiers corresponding to a first subset of the first set of HD CTs and a second set of identifiers corresponding to a second subset of the second set of HD CTs. The processing logic schedules radio resources of the radio for one or more of the first subset for the first radio frame and schedules radio resources of the radio for one or more of the second subset for the second radio frame.

In a further embodiment, the processing logic determines the first set of identifiers by determining that a throughput value of an HD CT is above a threshold value corresponding to DL transmissions. The throughput value can be a value that quantifies at least one parameter of the throughput information. For example the throughput value can be a measure or a rate of successful transmissions over a given channel. In other words a DL throughput value can represent the rate of successful DL transmissions with an HD CT and a UL throughput value can represent the rate of successful UL transmissions with another HD CT. In another embodiment, the processing logic determines the second set of identifiers by determining that a throughput value of an HD CT is above a threshold value corresponding to UL transmissions. In a further embodiment, the processing logic sends the first radio frame in a first frequency band and sends the second radio frame in a second frequency band that is different than the first frequency band.

In another embodiment, the processing logic, for each of the first set of HD CTs, determines a difference value between a committed information rate (CIR) value and a throughput value, and determines that the difference value is greater than a first threshold. In one embodiment, the difference value represents a difference (e.g., a discrepancy) between the CIR value and the throughput information. The first set of identifiers includes each of the first set of HD CTs having the difference value greater than the first threshold. In a further embodiment, the processing logic, for each of the second set of HD CTs, determines a difference value between a committed information rate (CIR) value and the throughput value and determines that the difference value is greater than a second threshold. The second set of identifiers includes each of the second set of HD CTs having the difference value greater than the second threshold.

Figure 4:
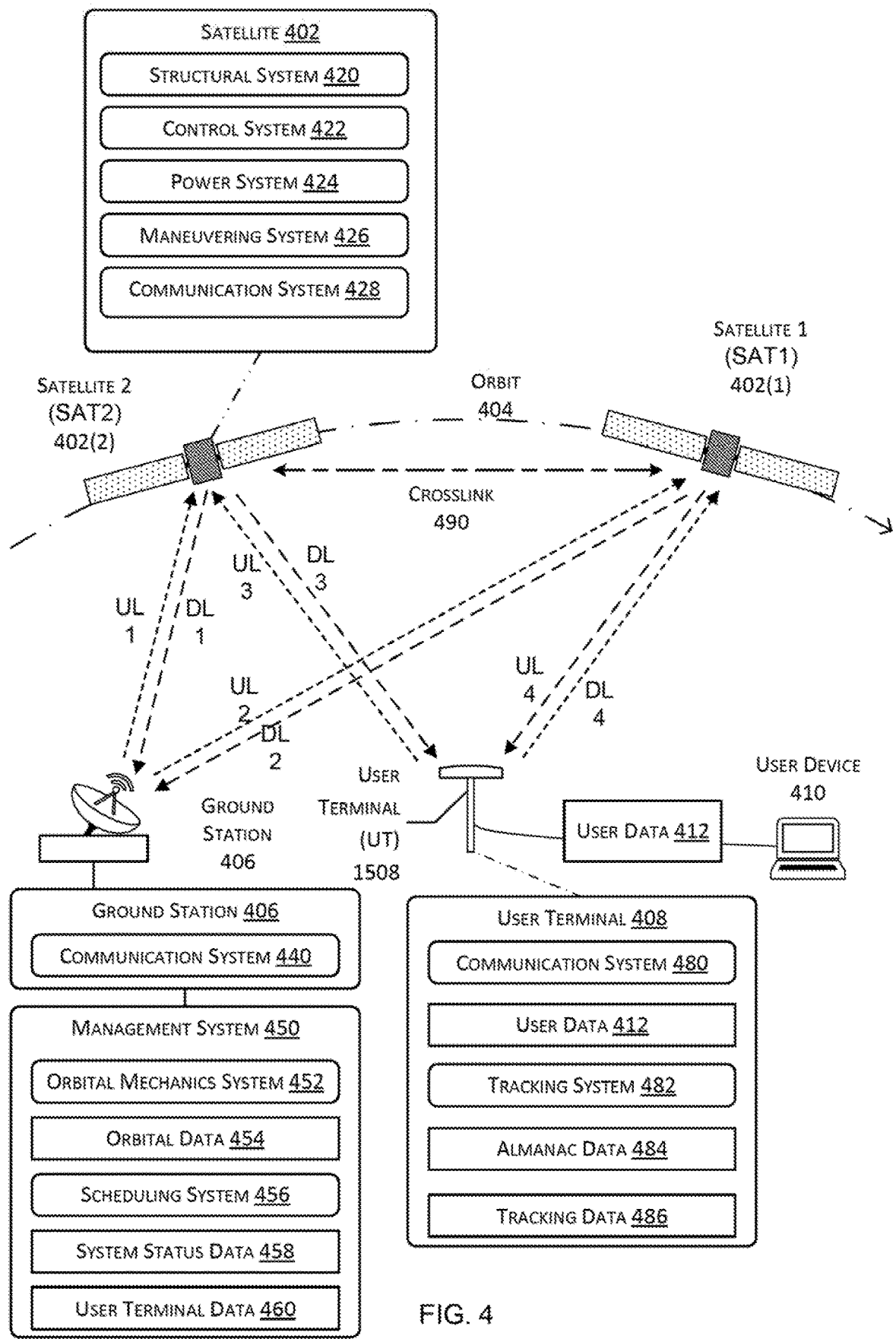
FIG. 4 illustrates a system including a constellation of satellites, each satellite being in orbit according to one embodiment.

FIG. 4 illustrates a system 400 including a constellation of satellites 402(1), 402(2), . . . , 402(S), each satellite 402 being in orbit 404 according to one embodiment. The system 400 shown here comprises a plurality (or "constellation") of satellites 402(1), 402(2), . . . , 402(S), each satellite 402 being in orbit 404. Any of the satellites 402 can include the communication system 100 of FIG. 1, or the satellite communication systems of FIGS. 2-3. Also shown is a ground station 406, user terminal (UT) 408, and a user device 410.

The constellation may comprise hundreds or thousands of satellites 402, in various orbits 404. For example, one or more of these satellites 402 may be in non-geosynchronous orbits (NGOs) in which they are in constant motion with respect to the Earth. For example, the orbit 404 is a low earth orbit (LEO). In this illustration, orbit 404 is depicted with an arc pointed to the right. A first satellite (SAT1) 402(1) is leading (ahead of) a second satellite (SAT2) 402(2) in the orbit 404.

The satellite 402 may comprise a structural system 420, a control system 422, a power system 424, a maneuvering system 426, and a communication system 428 described herein. In other implementations, some systems may be omitted or other systems added. One or more of these systems may be communicatively coupled with one another in various combinations.

The structural system 420 comprises one or more structural elements to support operation of the satellite 402. For example, the structural system 420 may include trusses, struts, panels, and so forth. The components of other systems may be affixed to, or housed by, the structural system 420. For example, the structural system 420 may provide mechanical mounting and support for solar panels in the power system 424. The structural system 420 may also provide for thermal control to maintain components of the satellite 402 within operational temperature ranges. For example, the structural system 420 may include louvers, heat sinks, radiators, and so forth.

The control system 422 provides various services, such as operating the onboard systems, resource management, providing telemetry, processing commands, and so forth. For example, the control system 422 may direct operation of the communication system 428.

The power system 424 provides electrical power for operation of the components onboard the satellite 402. The power system 424 may include components to generate electrical energy. For example, the power system 424 may comprise one or more photovoltaic cells, thermoelectric devices, fuel cells, and so forth. The power system 424 may include components to store electrical energy. For example, the power system 424 may comprise one or more batteries, fuel cells, and so forth.

The maneuvering system 426 maintains the satellite 402 in one or more of a specified orientation or orbit 404. For example, the maneuvering system 426 may stabilize the satellite 402 with respect to one or more axis. In another example, the maneuvering system 426 may move the satellite 402 to a specified orbit 404. The maneuvering system 426 may include one or more computing devices, sensors, thrusters, momentum wheels, solar sails, drag devices, and so forth. For example, the sensors of the maneuvering system 426 may include one or more global navigation satellite system (GNSS) receivers, such as global positioning system (GPS) receivers, to provide information about the position and orientation of the satellite 402 relative to Earth. In another example, the sensors of the maneuvering system 426 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 428 provides communication with one or more other devices, such as other satellites 402, ground stations 406, user terminals 408, and so forth. The communication system 428 may include one or more modems, digital signal processors, power amplifiers, antennas (including at least one antenna that implements multiple antenna elements, such as a phased array antenna, and including an embedded calibration antenna, such as the calibration antenna 104 as described herein), processors, memories, storage devices, communications peripherals, interface buses, and so forth. Such components support communications with other satellites 402, ground stations 406, user terminals 408, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 428 may be output to other systems, such as to the control system 422, for further processing. Output from a system, such as the control system 422, may be provided to the communication system 428 for transmission.

One or more ground stations 406 are in communication with one or more satellites 402. The ground stations 406 may pass data between the satellites 402, a management system 450, networks such as the Internet, and so forth. The ground stations 406 may be emplaced on land, on vehicles, at sea, and so forth. Each ground station 406 may comprise a communication system 440. Each ground station 406 may use the communication system 440 to establish communication with one or more satellites 402, other ground stations 406, and so forth. The ground station 406 may also be connected to one or more communication networks. For example, the ground station 406 may connect to a terrestrial fiber optic communication network. The ground station 406 may act as a network gateway, passing user data 412 or other data between the one or more communication networks and the satellites 402. Such data may be processed by the ground station 406 and communicated via the communication system 440. The communication system 440 of a ground station may include components similar to those of the communication system 428 of a satellite 402 and may perform similar communication functionalities. For example, the communication system 440 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 406 are in communication with a management system 450. The management system 450 is also in communication, via the ground stations 406, with the satellites 402 and the UTs 408. The management system 450 coordinates operation of the satellites 402, ground stations 406, UTs 408, and other resources of the system 400. The management system 450 may comprise one or more of an orbital mechanics system 452 or a scheduling system 456. The scheduling system 456 can include the DL scheduler 104 and UL scheduler 106 as described with respect to FIG. 1. In some embodiments, the scheduling system 456 can operate in conjunction with an HD controller, such as the HD controller 102 of FIG. 1.

The orbital mechanics system 452 determines orbital data 454 that is indicative of a state of a particular satellite 402 at a specified time. In one implementation, the orbital mechanics system 452 may use orbital elements that represent characteristics of the orbit 404 of the satellites 402 in the constellation to determine the orbital data 454 that predicts location, velocity, and so forth of particular satellites 402 at particular times or time intervals. For example, the orbital mechanics system 452 may use data obtained from actual observations from tracking stations, data from the satellites 402, scheduled maneuvers, and so forth to determine the orbital elements. The orbital mechanics system 452 may also consider other data, such as space weather, collision mitigation, orbital elements of known debris, and so forth.

The scheduling system 456 schedules resources to provide communication to the UTs 408. For example, the scheduling system 456 may determine handover data that indicates when communication is to be transferred from the first satellite 402(1) to the second satellite 402(2). Continuing the example, the scheduling system 456 may also specify communication parameters such as frequency, timeslot, and so forth. During operation, the scheduling system 456 may use information such as the orbital data 454, system status data 458, user terminal data 460, and so forth.

The system status data 458 may comprise information such as which UTs 408 are currently transferring data, satellite availability, current satellites 402 in use by respective UTs 408, capacity available at particular ground stations 406, and so forth. For example, the satellite availability may comprise information indicative of satellites 402 that are available to provide communication service or those satellites 402 that are unavailable for communication service. Continuing the example, a satellite 402 may be unavailable due to malfunction, previous tasking, maneuvering, and so forth. The system status data 458 may be indicative of past status, predictions of future status, and so forth. For example, the system status data 458 may include information such as projected data traffic for a specified interval of time based on previous transfers of user data 412. In another example, the system status data 458 may be indicative of future status, such as a satellite 402 being unavailable to provide communication service due to scheduled maneuvering, scheduled maintenance, scheduled decommissioning, and so forth.

The user terminal data 460 may comprise information such a location of a particular UT 408. The user terminal data 460 may also include other information such as a priority assigned to user data 412 associated with that UT 408, information about the communication capabilities of that particular UT 408, and so forth. For example, a particular UT 408 in use by a business may be assigned a higher priority relative to a UT 408 operated in a residential setting. Over time, different versions of UTs 408 may be deployed, having different communication capabilities such as being able to operate at particular frequencies, supporting different signal encoding schemes, having different antenna configurations, and so forth.

The UT 408 includes a communication system 480 to establish communication with one or more satellites 402. The communication system 480 of the UT 408 may include components similar to those of the communication system 428 of a satellite 402 and may perform similar communication functionalities. For example, the communication system 480 may include one or more modems, digital signal processors, power amplifiers, antennas (including at least one antenna that implements multiple antenna elements, such as a phased array antenna), processors, memories, storage devices, communications peripherals, interface buses, and so forth. The UT 408 passes user data 412 between the constellation of satellites 402 and the user device 410. The user data 412 includes data originated by the user device 410 or addressed to the user device 410. The UT 408 may be fixed or in motion. For example, the UT 408 may be used at a residence, or on a vehicle such as a car, boat, aerostat, drone, airplane, and so forth.

The UT 408 includes a tracking system 482. The tracking system 482 uses almanac data 484 to determine tracking data 486. The almanac data 484 provides information indicative of orbital elements of the orbit 404 of one or more satellites 402. For example, the almanac data 484 may comprise orbital elements such as "two-line element" data for the satellites 402 in the constellation that are broadcast or otherwise sent to the UTs 408 using the communication system 480.

The tracking system 482 may use the current location of the UT 408 and the almanac data 484 to determine the tracking data 486 for the satellite 402. For example, based on the current location of the UT 408 and the predicted position and movement of the satellites 402, the tracking system 482 is able to calculate the tracking data 486. The tracking data 486 may include information indicative of azimuth, elevation, distance to the second satellite, time of flight correction, or other information at a specified time. The determination of the tracking data 486 may be ongoing. For example, the first UT 408 may determine tracking data 486 every 400 ms, every second, every five seconds, or at other intervals.

With regard to FIG. 4, an uplink is a communication link which allows data to be sent to a satellite 402 from a ground station 406, UT 408, or device other than another satellite 402. Uplinks are designated as UL1, UL2, UL3 and so forth. For example, UL1 is a first uplink from the ground station 406 to the second satellite 402(2). In comparison, a downlink is a communication link which allows data to be sent from the satellite 402 to a ground station 406, UT 408, or device other than another satellite 402. For example, DL1 is a first downlink from the second satellite 402(2) to the ground station 406. The satellites 402 may also be in communication with one another. For example, a crosslink 490 provides for communication between satellites 402 in the constellation.

The satellite 402, the ground station 406, the user terminal 408, the user device 410, the management system 450, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 5:
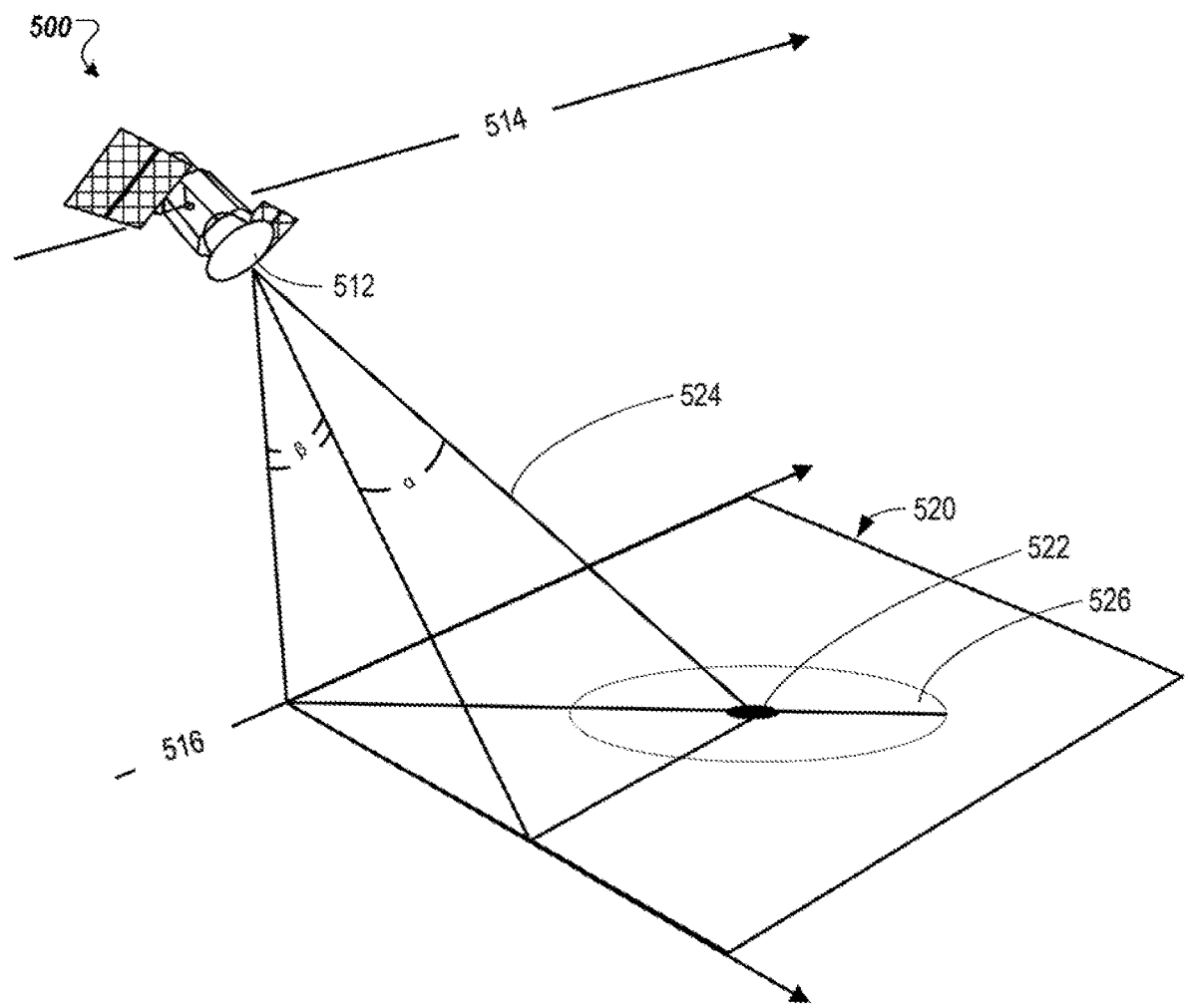
FIG. 5 illustrates the satellite including an antenna system that is steerable according to one embodiment.

FIG. 5 illustrates the satellite 500 including an antenna system 512 that is steerable according to one embodiment. The satellite 500 can include the communication system 100 of FIG. 1. The antenna system 512 may include multiple antenna elements that form an antenna and that can be mechanically or electrically steered individually, collectively, or a combination thereof. In an example, the antenna is a phased array antenna.

In orbit 404, the satellite 500 follows a path 514, the projection of which onto the surface of the Earth forms a ground path 516. In the example illustrated in FIG. 5, the ground path 516 and a projected axis extending orthogonally from the ground path 516 at the position of the satellite 500, together define a region 520 of the surface of the Earth. In this example, the satellite 500 is capable of establishing uplink and downlink communications with one or more of ground stations, user terminals, or other devices within the region 520, including a ground station 106 and a user terminal 108 of FIG. 1. In some embodiments, the region 520 may be located in a different relative position to the ground path 516 and the position of the satellite 500. For example, the region 520 may describe a region of the surface of the Earth directly below the satellite 500. Furthermore, embodiments may include communications between the satellite 500, an airborne communications system, and so forth.

As shown in FIG. 5, a communication target 522 (e.g., a ground station, a user terminal, or a CT (such as an HD CT)) is located within the region 520. The satellite 500 controls the antenna system 512 to steer transmission and reception of communications signals to selectively communicate with the communication target 522. For example, in a downlink transmission from the satellite 500 to the communication target 522, a signal beam 524 emitted by the antenna system 512 is steerable within an area 526 of the region 520. In some implementations, the signal beam 524 may comprise a plurality of subbeams. The extents of the area 526 define an angular range within which the signal beam 524 is steerable, where the direction of the signal beam 524 is described by a beam angle "α" relative to a surface normal vector of the antenna system 512. In two-dimensional phased array antennas, the signal beam 524 is steerable in two dimensions, described in FIG. 5 by a second angle "β" orthogonal to the beam angle α. In this way, the area 526 is a two-dimensional area within the region 520, rather than a linear track at a fixed angle determined by the orientation of the antenna system 512 relative to the ground path 516.

In FIG. 5, as the satellite 500 follows the path 514, the area 526 tracks along the surface of the Earth. In this way, the communication target 522, which is shown centered in the area 526 for clarity, is within the angular range of the antenna system 512 for a period of time. During that time, signals communicated between the satellite 500 and the communication target 522 are subject to bandwidth constraints, including but not limited to signal strength and calibration of the signal beam 524. In an example, for phased array antenna systems, the signal beam 524 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:
a modem comprising a half-duplex (HD) controller, a downlink (DL) scheduler coupled to the HD controller, and an uplink (UL) scheduler coupled to the HD controller, wherein the HD controller, the DL scheduler, and the UL scheduler are implemented in a media access control (MAC) layer; and
a radio coupled to the modem, wherein the radio operates at a first frequency for DL communications with customer terminals (CTs) and at a second frequency for DL communications with CTs, wherein:
the HD controller obtains first information from the DL scheduler about which of the CTs were scheduled for DL communication in a previous radio frame, a first quality of service (QoS) value, a first fairness indicator, a DL channel quality indicator (CQI) value, and a first buffer size;
the HD controller obtains second information from the UL scheduler about which of the CTs were scheduled for UL communication in a previous radio frame, a second QoS value, a second fairness indicator, and a UL CQI value, and a second buffer size;
the HD controller determines a first subset of identifiers of the CTs that are eligible for DL scheduling at a first radio frame and a second subset of identifiers of the CTs that are eligible for UL scheduling at a second radio frame based on the first information and the second information, respectively;
the HD controller sends first instructions to the DL scheduler, the first instructions comprising third information representing the first subset of identifiers that are eligible for DL scheduling;
the DL scheduler selects one or more of the CTs from the first subset of identifiers for DL communications in the first radio frame and allocates radio resources to be used for the DL communications to the one or more of the CTs;
the HD controller sends second instructions to the UL scheduler, the second instructions comprising fourth information representing the second subset of identifiers for UL scheduling;
the UL scheduler selects one or more of the CTs from the second subset of identifiers for UL communications in the second radio frame and allocates radio resources to be used for the UL communications to the one or more of the CTs;
the HD controller obtains fifth information from the DL scheduler about the one or more of the CTs that were selected for the first radio frame; and
the HD controller obtains sixth information from the UL scheduler about the one or more of the CTs that were selected for the second radio frame.

2. The communication system of claim 1, wherein:
to determine the first subset of identifiers, the HD controller determines that a first HD CT has a DL throughput value that is greater than a first threshold value and adds the first HD CT to the first subset; and
to determine the second subset of identifiers, the HD controller determines that a second HD CT has a UL throughput value that greater than a second threshold value and adds the second HD CT to the second subset.

3. A communication system comprising:
a radio; and
a modem coupled to the radio, the modem comprising a half-duplex (HD) controller, an downlink (DL) scheduler coupled to the HD controller, and an uplink (UL) scheduler coupled to the HD controller, wherein the HD controller is configured to:
determine a first plurality of HD customer terminals (CTs) that are eligible for being scheduled for downlink (DL) transmissions for a first radio frame and a second plurality of HD CTs that are eligible for being scheduled for uplink (UL) transmissions for a second radio frame;
determine a throughput value for each of the first plurality of HD CTs and each of the second plurality of HD CTs;
determine buffer information about each of the first plurality of HD CTs and each of the second plurality of HD CTs; and
determine, using the throughput values and the buffer information, a first subset of HD CTs from the first plurality of HD CTs and a second subset of HD CTs from the second plurality of HD CTs, and wherein:

the DL scheduler is configured to schedule radio resources of the radio for one or more HD CTs of the first subset for the first radio frame; and the UL scheduler is configured to schedule radio resources of the radio for one or more HD CTs of the second subset for the second radio frame.

4. The communication system of claim 3, wherein, for each HD CT of the first subset of HD CTs, the HD controller is further configured to:

determine a difference value representing a difference between a committed information rate (CIR) value and the throughput value, wherein the CIR value is representative of a minimum bandwidth that is allotted for DL transmissions; and determine that the difference value is greater than a first threshold.

5. The communication system of claim 3, wherein, for each HD CT of the second subset of HD CTs, the HD controller is further configured to:

determine a difference value between a committed information rate (CIR) value and the throughput value, wherein the CIR value is representative of a minimum bandwidth that is allotted for UL transmissions; and determine that the difference value is greater than a second threshold.

6. The communication system of claim 3, wherein, for each of the second plurality of HD CTs, the HD controller is further configured to:

determine that a HD CT is eligible for being scheduled for DL transmissions and UL transmissions;

determine a ratio between a first throughput value and a second throughput value, the first throughput value corresponding to DL transmissions and the second throughput value corresponding to UL transmissions;

determine that the ratio is greater than a threshold value; and remove the HD CT from the first subset in response to the ratio being greater than the threshold value.

7. The communication system of claim 6, wherein the HD controller is further configured to:

determine that a quality of service (QoS) value of the HD CT is within a QoS range;

determine that a DL queue backlog value of the HD CT is within a threshold value; and remove the HD CT from the first subset of HD CTs.

8. The communication system of claim 3, wherein the HD controller is further configured to:

determine that a quality of service (QoS) value of the HD CT is within a QoS range;

determine that a UL queue backlog value of the HD CT is within a threshold value; and remove the HD CT from the second subset of HD CTs.

9. The communication system of claim 3, wherein the HD controller:

determines that the first subset of HD CTs includes an HD CT and the second subset of HD CTs includes the HD CT, wherein the HD CT is eligible for being scheduled for DL transmissions and UL transmissions;

determines that a ratio of a DL skew value to a UL skew value is greater than a first skew value; and removes an identifier of the HD CT from the first subset of HD CTs.

10. The communication system of claim 9, wherein the HD controller:

determines that the ratio of the DL skew value to the UL skew value is greater than a second skew value; and removes the identifier of the HD CT from the second subset of HD CTs.

11. The communication system of claim 3, wherein the DL scheduler and the UL scheduler are in a media access control (MAC) layer of the communication system.

12. The communication system of claim 3, wherein the radio is an HD radio or a full-duplex radio.

13. The communication system of claim 3, wherein the HD controller is further to receive information from the DL scheduler, the information comprising which of the first plurality of HD CTs were previously scheduled by the DL scheduler, a QoS value, a fairness indicator, a DL channel quality indicator (CQI) value, and a buffer size.

14. The communication system of claim 3, wherein the HD controller is further to receive information from the UL scheduler, the information which of the plurality of HD CTs were previously scheduled by the UL scheduler, a QoS value, a fairness indicator, a UL CQI value, and a buffer size.

15. A method comprising:

determining, by a half-duplex (HD) controller of a communication system, a first plurality of HD customer terminals (CTs) that are eligible for being scheduled for downlink (DL) transmissions for a first radio frame and a second plurality of HD CTs that are eligible for being scheduled for uplink (UL) transmissions for a second radio frame;

determining, by the HD controller, a throughput value for each of the first plurality of HD CTs and each of the second plurality of HD CTs;

determining, by the HD controller, buffer information about each of the first plurality of HD CTs and each of the second plurality of HD CTs;

determining, using the throughput values and the buffer information, a first subset of HD CTs from the first plurality of HD CTs and a second subset of HD CTs from the second plurality of HD CTs;

scheduling, by a DL scheduler of the communication system, radio resources of a radio for one or more HD CTs of the first subset for the first radio frame; and scheduling, by a UL scheduler of the communication system, radio resources of the radio for one or more HD CTs of the second subset for the second radio frame.

16. The method of claim 15, further comprising, for each HD CT of the first subset of HD CTs, determining a difference value between a committed information rate (CIR) value and the throughput value, wherein the CIR value is representative of a minimum bandwidth that is allotted for DL transmissions; and determining that the difference value is greater than a first threshold.

17. The method of claim 15, further comprising, for each HD CT of the second subset of HD CTs, determining a difference value between a committed information rate (CIR) value and the throughput value, wherein the CIR value is representative of a minimum bandwidth that is allotted for UL transmissions; and determining that the difference value is greater than a second threshold.

18. The method of claim 15, wherein:

determining the first subset of HD CTs s comprises determining that the throughput value of an HD CT is above a threshold value corresponding to DL transmissions; and determining the second subset of HD CTs comprises determining that the throughput value of an HD CT is above a threshold value corresponding to UL transmissions.

19. The method of claim 15, further comprising sending the first radio frame in a first frequency band and sending the second radio frame in a second frequency band that is different than the first frequency band.

20. The method of claim 15, further comprising:
for each of the first plurality of HD CTs,
- determining a difference value between a committed information rate (CIR) value and a throughput value; and
- determining that the difference value is greater than a first threshold, wherein the first subset of HD CTs includes each of the first plurality of HD CTs having the difference value greater than the first threshold; and for each of the second plurality of HD CTs,
- determining a difference value between a committed information rate (CIR) value and the throughput value; and
- determining that the difference value is greater than a second threshold, wherein the second subset of HD CTs includes each of the second plurality of HD CTs having the difference value greater than the second threshold.

* * * * *